US007951253B2

(12) United States Patent
Shim et al.

(10) Patent No.: US 7,951,253 B2
(45) Date of Patent: May 31, 2011

(54) METHOD OF MANUFACTURING DISPLAY DEVICE, METHOD OF PREPARING ELECTRODE, AND ELECTRODE COMPOSITION FOR OFFSET PRINTING

(75) Inventors: Jae Joon Shim, Yongin-si (KR); Myung Sung Jung, Gyeongju-si (KR); Kuninori Okamoto, Seongnam-si (KR); Yeong Seok Kim, Gunpo-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 91 days.

(21) Appl. No.: 12/379,346

(22) Filed: Feb. 19, 2009

(65) Prior Publication Data

US 2009/0159180 A1 Jun. 25, 2009

Related U.S. Application Data

(63) Continuation-in-part of application No. PCT/KR2006/005623, filed on Dec. 21, 2006.

(30) Foreign Application Priority Data

Aug. 24, 2006 (KR) ........................ 10-2006-0080623

(51) Int. Cl.

| | |
|---|---|
| ***B44C 1/24*** | (2006.01) |
| ***H01B 1/06*** | (2006.01) |
| ***C08L 29/04*** | (2006.01) |
| *B01J 13/00* | (2006.01) |
| *B44C 1/18* | (2006.01) |

(52) U.S. Cl. ......... 156/235; 156/230; 252/511; 524/557

(58) Field of Classification Search .................. 524/494, 524/379, 385–388, 439, 440, 557, 560, 561, 524/997; 534/533–536; 252/511–514; 156/230, 232, 235; 523/400

See application file for complete search history.

(56) References Cited

U.S. PATENT DOCUMENTS

| | | | | |
|---|---|---|---|---|
| 5,421,926 | A * | 6/1995 | Yukinobu et al. | 156/83 |
| 5,814,434 | A | 9/1998 | Nakamura et al. | |
| 6,156,433 | A * | 12/2000 | Hatori et al. | 428/411.1 |
| 6,207,268 | B1 * | 3/2001 | Kosaka et al. | 428/325 |
| 6,214,527 | B1 | 4/2001 | Kosaka et al. | |
| 6,800,166 | B2 * | 10/2004 | Kosaka et al. | 156/230 |

(Continued)

FOREIGN PATENT DOCUMENTS

CN 1 366 323 A 8/2002

(Continued)

OTHER PUBLICATIONS

English translation of JP10-168427; Kim et al. Mar. 6, 1998.*

(Continued)

*Primary Examiner* — Philip C Tucker
*Assistant Examiner* — Sonya Mazumdar
(74) *Attorney, Agent, or Firm* — Lee & Morse, P.C.

(57) ABSTRACT

A method of manufacturing a display device, including providing a composition including a conductive material, an organic binder; a glass frit, and a solvent, wherein the organic binder has a glass transition temperature of about −50° C. to about −5° C., loading the composition into grooves of a gravure roll, transferring the composition from the grooves of the gravure roll onto a silicone rubber blanket roll, transferring the composition from the blanket roll onto a glass substrate, and drying and firing the composition transferred on the glass substrate to form an electrode.

21 Claims, 2 Drawing Sheets

U.S. PATENT DOCUMENTS

| | | | | |
|---|---|---|---|---|
| 6,853,001 | B2 | 2/2005 | Kondo et al. | |
| 6,923,881 | B2 * | 8/2005 | Tateishi et al. | 156/240 |
| 7,217,334 | B2 * | 5/2007 | Toyoda | 156/230 |
| 7,544,264 | B2 * | 6/2009 | Tateishi | 156/237 |
| 2006/0125405 | A1 | 6/2006 | Seo et al. | |
| 2007/0006752 | A1 * | 1/2007 | Hunahata | 101/217 |
| 2008/0075921 | A1 * | 3/2008 | Tateishi | 428/141 |

FOREIGN PATENT DOCUMENTS

| | | | | |
|---|---|---|---|---|
| CN | 1 545 111 | A | | 11/2004 |
| CN | 1 655 285 | A | | 8/2005 |
| CN | 1 687 922 | A | | 10/2005 |
| CN | 1687992 | A | * | 10/2005 |
| JP | 60-0008372 | A | | 1/1985 |
| JP | 09-244230 | A | | 9/1997 |
| JP | 10-168427 | A | | 6/1998 |
| JP | 11198337 | A | * | 7/1999 |
| JP | 2000289320 | A | * | 10/2000 |
| JP | 2001056405 | A | * | 2/2001 |
| JP | 2003-071962 | A | | 3/2003 |
| JP | 2005-067959 | A | | 3/2005 |
| JP | 2005-158295 | A | | 6/2005 |
| JP | 2007015235 | A | * | 1/2007 |
| KR | 10-2005-0055276 | A | | 6/2005 |
| KR | 10-2006-0031630 | A | | 4/2006 |
| WO | WO 2008023864 | A1 | * | 2/2008 |

OTHER PUBLICATIONS

English translation of JP 2005-067959; Morita et al. Mar. 17, 2005.*

English Translation of CN200310119264; Lin Baoping et al. Aug. 17, 2005; sipo.gov.cn.*

English Translation of CN200510038022; Liao Xiahua. Nov. 10, 2004; sipo.gov.cn.*

English Translation of JP10168427, Kim et al. Jun. 23, 1998.*

English Translation of JP2005067959, Morita et al. Mar. 17, 2005.*

* cited by examiner

FIG. 2

TABLE 1: Evaluation of electrodes according to Examples 1 to 3 and Comparative Example 1.

| Evaluation | Ex.1 | Ex.2 | Ex.3 | Ex.4 | C.Ex.1 |
|---|---|---|---|---|---|
| Glass Transition Temp of Copolymer Resin (°C) | -15 | -15 | -15 | -15 | 100 |
| Off Process | ⦿ | ○ | ⦿ | ○ | ⦿ |
| Set Process | ⦿ | ⦿ | ○ | ⦿ | × |
| Residue on Blanket after Set Process | ⦿ | ⦿ | ⦿ | ○ | × |
| Resistivity (μΩ cm) | 3.6 | 3.6 | 3.6 | 3.6 | 3.2 |
| Thickness after Burning (μm) | 3.0 | 3.0 | 3.0 | 3.0 | 3.0 |
| Shape of Electrode after Burning | ⦿ | ○ | ⦿ | ○ | × |

(⦿: excellent, ○: good, ×: poor)

METHOD OF MANUFACTURING DISPLAY DEVICE, METHOD OF PREPARING ELECTRODE, AND ELECTRODE COMPOSITION FOR OFFSET PRINTING

CROSS-REFERENCE TO RELATED APPLICATION

This application is a continuation-in-part of PCT Application No. PCT/KR2006/005623, entitled: "Electrode Composition for Offset Print, Method for Preparing a Electrode by the Same and a Plasma Display Panel Using the Same," which was filed on Dec. 21, 2006, and is hereby incorporated by reference in its entirety.

BACKGROUND OF THE INVENTION

1. Field of the Invention

Embodiments relate to a method of manufacturing a display device, a method of preparing an electrode, and an electrode composition for offset printing.

2. Description of the Related Art

An alternating current (AC) type plasma display panel ("PDP") may include a front glass substrate composed of transparent electrodes (sustain electrodes), bus electrodes, and a dielectric layer for covering the electrodes. The PDP may also include a rear glass substrate facing the front glass substrate and having a cell structure composed of address electrodes, a dielectric layer, barrier ribs, and phosphors. The electrodes of the two substrates may be arranged perpendicular to each other.

Typically, an electrode formation method may include applying a photosensitive electrode composition on the entire surface of a glass substrate through screen printing, performing photolithography to leave only a necessary portion, and then performing a firing process, thus preparing an electrode.

However, the conventional method employing photolithography has drawbacks because all portions, including unnecessary portions, are printed, and then the unnecessary portions are removed through development. The expensive material that is removed through development is lost, thus increasing the preparation cost. Also, since the electrode is prepared via a series of processes of printing, drying, exposure, development, and firing, the process time may be undesirably long.

In another conventional process including screen printing, a metal and polyester screen mask used in the printing process may become extended and deformed over time, and thus the thickness of the printed film may become non-uniform. Thus, the conventional art has technical limitations due to disadvantages including, e.g., high material cost, the large number of processes, and the expensive apparatus.

SUMMARY OF THE INVENTION

Embodiments are therefore directed to a method of manufacturing a display device, a method of preparing an electrode, and an electrode composition for offset printing, which substantially overcome one or more of the problems due to the limitations and disadvantages of the prior art.

It is therefore a feature of an embodiment to provide an electrode formed using fewer process steps.

It is therefore another feature of an embodiment to provide an electrode formed using a process that does not waste expensive conductive materials.

At least one of the above features and advantages may be realized by providing a method of manufacturing a display device, including providing a composition including a conductive material, an organic binder, a glass frit, and a solvent, wherein the organic binder has a glass transition temperature of about −50° C. to about −5° C., loading the composition into grooves of a gravure roll, transferring the composition from the grooves of the gravure roll onto a silicone rubber blanket roll, transferring the composition from the blanket roll onto a glass substrate, and drying and firing the composition transferred on the glass substrate to form an electrode.

The method may further include combining the glass substrate with a second substrate to form a substrate assembly, sealing the substrate assembly, and injecting the substrate assembly with a discharge gas.

The display device may include a plasma display panel formed from the substrate assembly.

The composition may include about 50 to about 95 wt % of the conductive material, about 1 to about 20 wt % of the organic binder, and about 1 to about 20 wt % of the glass frit.

The organic binder may include a compound including repeating units represented by Formula 1:

(1)

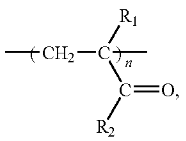

wherein, in Formula 1, n is an integer greater than or equal to 1, $R_1$ is H or $CH_3$, and $R_2$ is a linear or branched $C_1$-$C_{12}$ alkyl, a substituted or unsubstituted allyl, a substituted or unsubstituted aryl, a linear or branched $C_1$-$C_{12}$ alkoxy, a substituted or unsubstituted allyloxy, or a substituted or unsubstituted aryloxy.

The organic binder may have a weight average molecular weight of about 1,000 to about 200,000, and an acid value of about 20 to about 250 mgKOH/g.

The solvent may include at least one first solvent having a boiling point of about 100° C. to about 150° C. and at least one second solvent having a boiling point of about 200° C. to about 300° C.

The first solvent and the second solvent may be included in a first solvent:second solvent weight ratio of about 1:9 to about 9:1.

The glass frit may have a softening point of about 300° C. to about 600° C. and a glass transition temperature of about 200° C. to about 500° C.

The organic binder may include a copolymer of an ethylenically unsaturated monomer and a different ethylenically unsaturated monomer.

The different ethylenically unsaturated monomer may include at least one of an acrylic resin, an aqueous cellulose resin, a polyvinyl alcohol resin, an epoxy resin, a melamine resin, and a polyvinyl butyral resin.

At least one of the above features and advantages may also be realized by providing a method of preparing an electrode, including providing a composition including a conductive material, an organic binder, a glass frit, and a solvent, wherein the organic binder has a glass transition temperature of about −50° C. to about −5° C., loading the composition into grooves of a gravure roll, transferring the composition from the grooves of the gravure roll onto a silicone rubber blanket roll, transferring the composition from the blanket roll onto a glass substrate, and drying and firing the composition transferred on the glass substrate.

At least one of the above features and advantages may also be realized by providing an electrode composition, including a conductive material, an organic binder, a glass frit, and a solvent, wherein the organic binder has a glass transition temperature of about −50° C. to about −5° C.

The composition may include about 50 to about 95 wt % of the conductive material, about 1 to about 20 wt % of the organic binder, and about 1 to about 20 wt % of the glass frit.

The organic binder may include a compound including repeating units represented by Formula 1:

(1)

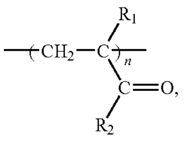

wherein, in Formula 1, n is an integer greater than or equal to 1, $R_1$ is H or $CH_3$, and $R_2$ is a linear or branched $C_1$-$C_{12}$ alkyl, a substituted or unsubstituted allyl, a substituted or unsubstituted aryl, a linear or branched $C_1$-$C_{12}$ alkoxy, a substituted or unsubstituted allyloxy, or a substituted or unsubstituted aryloxy.

The organic binder may have a weight average molecular weight of about 1,000 to about 200,000, and an acid value of about 20 to about 250 mgKOH/g.

The solvent may include at least one first solvent having a boiling point of about 100° C. to about 150° C. and at least one second solvent having a boiling point of about 200° C. to about 300° C.

The first solvent and the second solvent may be included in a first solvent:second solvent weight ratio of about 1:9 to about 9:1.

The glass frit may have a softening point of about 300° C. to about 600° C. and a glass transition temperature of about 200° C. to about 500° C.

The organic binder may include a copolymer of an ethylenically unsaturated monomer and a different ethylenically unsaturated monomer.

The different ethylenically unsaturated monomer may include at least one of an acrylic resin, an aqueous cellulose resin, a polyvinyl alcohol resin, an epoxy resin, a melamine resin, and a polyvinyl butyral resin.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates Table 1 showing evaluation results of compositions prepared according to Examples 1 to 4 and Comparative Example 1.

DETAILED DESCRIPTION OF THE INVENTION

Figure 1:
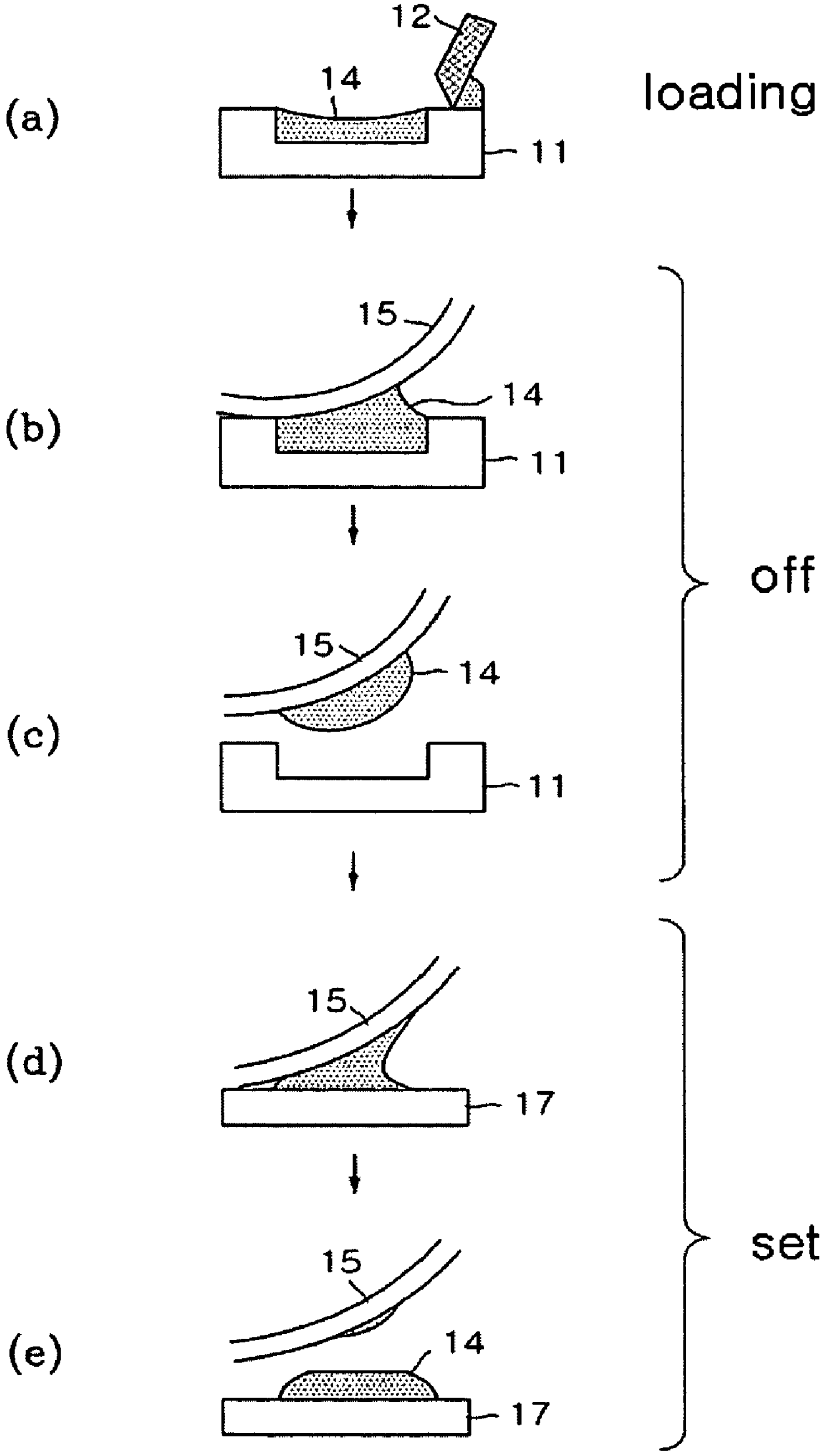
FIG. 1 illustrates a schematic view of the offset process using the electrode composition of an embodiment.

Korean Patent Application No. 10-2006-0080623, filed on Aug. 24, 2006, in the Korean Intellectual Property Office, and entitled: “Electrode Composition for Offset Print, Method for Preparing an Electrode by the Same and a Plasma Display Panel Using the Same,” is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being “on” another layer or substrate, it can be directly on the other layer or substrate, or intervening layers may also be present. Further, it will be understood that when a layer is referred to as being “under” another layer, it can be directly under, and one or more intervening layers may also be present. In addition, it will also be understood that when a layer is referred to as being “between” two layers, it can be the only layer between the two layers, or one or more intervening layers may also be present. Like reference numerals refer to like elements throughout.

As used herein, the expressions “at least one,” “one or more,” and “and/or” are open-ended expressions that are both conjunctive and disjunctive in operation. For example, each of the expressions “at least one of A, B, and C,” “at least one of A, B, or C,” “one or more of A, B, and C,” “one or more of A, B, or C” and “A, B, and/or C” includes the following meanings: A alone; B alone; C alone; both A and B together; both A and C together; both B and C together; and all three of A, B, and C together. Further, these expressions are open-ended, unless expressly designated to the contrary by their combination with the term “consisting of.” For example, the expression “at least one of A, B, and C” may also include an $n^{th}$ member, where n is greater than 3, whereas the expression “at least one selected from the group consisting of A, B, and C” does not.

As used herein, the expression “or” is not an “exclusive or” unless it is used in conjunction with the term “either.” For example, the expression “A, B, or C” includes A alone; B alone; C alone; both A and B together; both A and C together; both B and C together; and all three of A, B, and C together, whereas the expression “either A, B, or C” means one of A alone, B alone, and C alone, and does not mean any of both A and B together; both A and C together; both B and C together; and all three of A, B, and C together.

As used herein, the terms “a” and “an” are open terms that may be used in conjunction with singular items or with plural items. For example, the term “a solvent” may represent a single compound, e.g., isopropyl alcohol, or multiple compounds in combination, e.g., isopropyl alcohol mixed with butoxyethanol.

As used herein, the language “wt. %” is exclusive of solvent, unless otherwise indicated. For example, where a composition is composed of two components A and B, with A present in 35 parts by weight and B present in 65 parts by weight, based on the total amount of the composition, the addition of 10 parts by weight of solvent to the composition would result in the composition continuing to have 35 parts by weight A and 65 parts by weight B, based on the total amount of the composition.

As used herein, molecular weights of polymeric materials are weight average molecular weights, unless otherwise indicated.

According to an embodiment, an electrode composition may be applied to a front substrate and/or a rear substrate of, e.g., a PDP, through offset printing, to reproducibly form a fine pattern. The pattern may then be formed into an electrode through heat treatment, e.g., firing. With reference to FIG. 1, an offset printing process is described.

The offset printing process of an embodiment may be divided into two procedures, e.g., an off process and a set process. Before the off process, the composition 14 of an embodiment may be loaded into a gravure roll 11. The gravure roll 11 may include a fine pattern having a line width of about 50 to about 150 mm and a depth of about 10 to about 50 mm. After loading the composition 14 into the gravure roll 11, a doctoring process including, e.g., scraping the composition 14 overflowing from the gravure roll 11 using a metal blade 12, may be performed. Then, the off process may be performed. A blanket roll 15 may be continuously compressed and rolled on the gravure roll 11 having the composition 14 loaded therein, so as to transfer the composition 14 from the grooves of the gravure roll 11 onto the surface of the blanket roll 15. The blanket roll 15 may be formed of, e.g., silicone rubber.

Then, the set process may be performed. The blanket roll 15 may be compressed and rolled on a glass substrate 17, in order to transfer the composition 14 from the surface of the blanket roll 15 onto the glass substrate 17.

Embodiments also provide an electrode composition suitable for offset printing, so that the composition in the grooves of the gravure roll may be uniformly transferred onto the silicone blanket without undesirable pattern protrusions or breaks in wires. Further, the composition on the silicone blanket roll may be completely transferred onto the glass substrate in the form of a fine electrode pattern, with a minimal amount of the composition remaining on the blanket roll during the offset process, reducing waste.

The electrode composition for offset printing of an embodiment may include about 50 to about 95 wt % of a conductive material, about 1 to about 20 wt % of an organic binder, and about 1 to about 20 wt % of glass frit, with the balance being solvent.

The conductive material included in the electrode composition for offset printing of an embodiment may increase conductivity, and may include at least one of gold, platinum, palladium, silver, copper, aluminum, nickel, and alloys thereof. The conductive material may be in the form of powder having a particle diameter of about 0.1 about 3 mm. Preferably, the powder has a particle diameter of about 0.5 to about 2 mm.

The conductive material may be included in an amount of about 50 to about 95 wt %. Preferably, the conductive material is included in an amount of about 60 to about 80 wt %. Maintaining the amount at about 50 wt % or greater may help ensure sufficient conductivity of the electrode. Maintaining the amount at about 95 wt % or less may help ensure that the electrode does not become undesirably thick, and it remains possible to perform a transferring process during offset printing.

In an embodiment, the organic binder may include a polymer resin having a glass transition temperature of about −50° C. to about −5° C. Maintaining the glass transition temperature of the organic binder at about −50° C. or greater may help ensure that undesirable pattern protrusions are not formed during the off process and the set process. In addition, maintaining the glass transition temperature of the organic binder at about −50° C. or greater may help ensure an advantageous ability to remove unnecessary impurities from the pattern on the glass substrate using compressed air. Maintaining the glass transition temperature of the organic binder at about −5° C. or less may help ensure that the composition transferred onto the blanket roll has sufficient adhesion and is easily transferred onto the glass substrate.

The organic binder may include a copolymer and/or a terpolymer of an ethylenically unsaturated monomer and another ethylenically unsaturated monomer copolymerizable therewith. Examples of the organic binder may include at least one of an acrylic resin, an aqueous cellulose resin, a polyvinyl alcohol resin, an epoxy resin, a melamine resin, and a polyvinyl butyral resin. In an implementation, the organic binder may include, e.g., methacrylic acid/2-ethylhexyl methacrylates/butyl acrylate terpolymer resin, n-hexylmethacrylate, isodecylmethacrylate, laurylmethacrylate, stearylmethacrylate, 2-ethylhexylmethacrylate, methylmethacrylate, etc.

The organic binder preferably includes a compound represented by Formula 1:

(1)

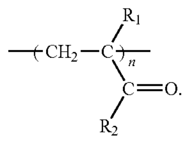

In Formula 1, n may be an integer greater than or equal to 1, and $R_1$ may include hydrogen or $CH_3$. $R_2$ may include a linear or branched $C_1$-$C_{12}$ alkyl, a substituted or unsubstituted allyl, a substituted or unsubstituted aryl, a linear or branched $C_1$-$C_{12}$ alkoxy, a substituted or unsubstituted allyloxy, or a substituted or unsubstituted aryloxy.

The organic binder may be included in an amount of about 1 to about 20 wt %. Preferably, the organic binder is included in an amount of about 5 to about 15 wt %. Maintaining the amount at about 1 wt % or greater may help ensure ease of transferring the composition during the off and set processes. In addition, maintaining the amount at about 1 wt % or greater may help ensure that the undesirable settling of inorganic material, e.g., silver powder, does not easily occur. Maintaining the amount at about 20 wt % or less may help ensure that pores are not generated in the surface of the electrode after firing, undesirably decreasing the conductivity of the electrode.

The organic binder may have a weight average molecular weight of about 1,000 to about 200,000 and an acid value of about 20 to about 250 mgKOH/g.

The solvent may have a boiling point of about 100° C. to about 300° C. The solvent preferably includes at least one of a primary and a secondary alcohol, which may avoid unduly expanding the silicone blanket roll.

The solvent may include, e.g., isopropyl alcohol, 2-ethylhexyl alcohol, methoxypentanol, butoxyethanol, ethoxyethoxy ethanol, butoxyethoxy ethanol, methoxy propoxy propanol, glycerol, ethyleneglycol, texanol, α-terpineol, kerosene, mineral spirits, and dihydroterpineol.

Further, in an embodiment, the solvent may include a first solvent having a boiling point of about 100° C. to about 150° C., and a second solvent having a boiling point of about 200° C. to about 300° C. When using a mixture of the first solvent and the second solvent, the mixing ratio of the first solvent to the second solvent is preferably about 1:9 to about 9:1. Maintaining the mixing ratio at about 1:9 or greater may help ensure ease of transferring the composition onto the substrate during the set process. Maintaining the mixing ratio at about 9:1 or less may help ensure that the composition has a sufficiently slow drying time, and is therefore easily removed from the gravure roll.

The glass frit used in an embodiment may function to beneficially increase adhesion between the conductive material and the substrate. The glass frit may include, e.g., lead oxide, bismuth oxide, or zinc oxide. The glass frit may have a softening point of about 300° C. to about 600° C., and a glass transition temperature of about 200° C. to about 500° C. In consideration of the thickness of the electrode pattern, it is preferable that the glass frit have a diameter of about 5 mm or less.

The glass frit may be included in an amount of about 1 to about 20 wt %. Preferably, the glass frit is included in an amount of about 3 to about 15 wt %. Maintaining the amount at about 1 wt % or greater may help ensure that the adhesion between the electrode pattern and the electrode substrate is sufficiently strong after the firing process. Maintaining the amount at about 20 wt % or less may help ensure that the relative amounts of conductive material and organic binder are not excessively decreased, which may result in low conductivity and low mechanical strength of the electrode pattern.

The composition may further include a plasticizer, which may be soluble in the binder solution, for controlling the solubility of the organic binder. The plasticizer, which may be miscible with the organic binder, may be used to control the drying properties. The plasticizer may include at least one of phthalic acid ester, adipic acid ester, phosphoric acid ester, trimellitic acid ester, citric acid ester, epoxy, polyester, glycerol. In an implementation, the plasticizer may include a monomer, an oligomer, or a trimer of an aqueous acrylic compound having a high boiling point.

In addition, a dispersant, a viscosity stabilizer, an anti-foaming agent, and a coupling agent may be further included in the composition.

Embodiments provide a method of preparing electrodes of a display device. According to an embodiment, a method of preparing an electrode may include preparing the composition of an embodiment, loading the composition into the grooves of a gravure roll, transferring the composition from the grooves of the gravure roll onto a blanket roll formed of, e.g., silicone rubber, transferring the composition from the blanket roll onto a glass substrate, and drying and firing the composition transferred on the glass substrate, thereby forming a desired electrode.

Embodiments provide a PDP, including the electrode formed using the above method.

Embodiments provide an electrode composition for offset printing, a method of preparing an electrode using the same, and a display device, e.g., a PDP, including the electrode. According to an embodiment, an electrode composition for offset printing is provided in order to realize a PDP, and the fabrication thereof. Using such a composition, electrodes may be quickly prepared on the front substrate and the rear substrate of the PDP while sufficient conductivity is assured and a fine pattern is reproducibly formed. Further, the electrode may be formed only on the necessary portion, and thus the loss of expensive conductive material may be decreased, thereby diminishing the material cost and making it possible to fabricate a PDP at low expense.

A better understanding of the embodiments may be obtained by way of the following examples, which are set forth to illustrate, but are not to be construed to be limiting.

EXAMPLE 1

17.5 wt % of a texanol solution including 60% by weight of a methacrylic acid/2-ethylhexyl methacrylates/butyl acrylate terpolymer resin, 0.17 wt % of malonic acid as a viscosity stabilizer, 64 wt % of silver powder, and 8.9 wt % of glass frit were mixed, stirred, and then kneaded and dispersed using a ceramic three roll mill. The resulting composition was then diluted with 9.5 wt % of methoxy propoxy propanol solvent in order to control the viscosity thereof.

EXAMPLE 2

17.5 wt % of a texanol solution including 60% by weight of a methacrylic acid/2-ethylhexyl methacrylates/butyl acrylate terpolymer resin, 0.17 wt % of malonic acid as a viscosity stabilizer, 64 wt % of silver powder, and 8.9 wt % of glass frit were mixed, stirred, and then kneaded and dispersed using a ceramic three roll mill. The resulting composition was then diluted with 9.5 wt % of butoxy ethanol solvent in order to control the viscosity thereof.

EXAMPLE 3

17.5 wt % of a texanol solution including 60% by weight of a methacrylic acid/2-ethylhexyl methacrylates/butyl acrylate terpolymer resin, 0.17 wt % of malonic acid as a viscosity stabilizer, 64 wt % of silver powder, and 8.9 wt % of glass frit were mixed, stirred, and then kneaded and dispersed using a ceramic three roll mill. The resulting composition was then diluted with 9.5 wt % of ethoxyethoxy ethanol solvent in order to control the viscosity thereof.

EXAMPLE 4

17.5 wt % of a butoxy ethanol solution including 60% by weight of a methacrylic acid/2-ethylhexyl methacrylates/butyl acrylate terpolymer resin, 0.17 wt % of malonic acid as a viscosity stabilizer, 64 wt % of silver powder, and 8.9 wt % of glass frit were mixed, stirred, and then kneaded and dispersed using a ceramic three roll mill. The resulting composition was then diluted with 9.5 wt % of butoxy ethanol solvent in order to control the viscosity thereof.

COMPARATIVE EXAMPLE 1

17.5 wt % of a texanol solution including 60% by weight of a methacrylic acid/methyl methacrylate copolymer resin, 0.17 wt % of malonic acid as a viscosity stabilizer, 64 wt % of silver powder, and 8.9 wt % of glass frit were mixed, stirred, and then kneaded and dispersed using a ceramic three roll mill. The resulting composition was then diluted with 9.5 wt % of dipropyleneglycol methyl ether solvent to control the viscosity thereof.

For evaluation, on a 14 cm×14 cm sized glass substrate having a high melting point, the composition of each of Examples 1 to 4 and Comparative Example 1 was applied using an offset printer to form an electrode pattern. The electrode pattern was then allowed to stand at 100° C. for 10 min in an IR belt oven to dry it. Thereafter, the transfer state on the blanket roll after the off process, and, after the set process, the transfer state on the substrate, and the presence of the composition residue on the blanket roll were observed. Then, the substrate was fired at 560° C. for 20 min to observe the shape of the pattern, and measure the resistance thereof. The results are shown in Table 1 of FIG. 2.

Evaluation Criteria

1. Off Process

Excellent: no pattern protrusions and no breakage of wires

Good: slight generation of pattern protrusions and breakage of wires

Poor: considerable generation of pattern protrusions and breakage of wires

2. Set Process

Excellent: no pattern protrusions and no breakage of wires

Good: slight generation of pattern protrusions and breakage of wires

Poor: considerable generation of pattern protrusions and breakage of wires

3. Residue on Blanket Roll after Set Process

Excellent: no residue

Good: a small amount of residue

Poor: a large amount of residue

4. Shape of Electrode after Firing

Excellent: electrode of which the upper portion is circular-shaped and the lower portion has no residue Good: electrode of which the upper portion is circular-shaped and the lower portion has residue Poor: electrode of which the upper portion is pointed and the lower portion has residue As is apparent from Table 1, in Examples 1 to 4, good results were obtained for all evaluation criteria. In Comparative Example 1, the evaluation results for the set process, the presence of residue on the blanket roll, and the shape of the electrode after firing were poor.

As described above, embodiments relate to a composition that may be applied on a substrate through offset printing such that only processes of printing, drying, and firing are performed, and thus the number of processes is smaller than that of conventional processes, and such that only a necessary portion is printed to thus reproducibly form a fine electrode pattern without wasting expensive material.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of manufacturing a display device, comprising:

providing a composition including a conductive material, an organic binder; a glass frit, and a solvent, wherein the organic binder has a glass transition temperature of about −50° C. to about −5° C.;

loading the composition into grooves of a gravure roll;

transferring the composition from the grooves of the gravure roll onto a silicone rubber blanket roll;

transferring the composition from the blanket roll onto a glass substrate; and drying and firing the composition transferred on the glass substrate to form an electrode.

2. The method of manufacturing a display device as claimed in claim 1, further comprising:

combining the glass substrate with a second substrate to form a substrate assembly;

sealing the substrate assembly; and injecting the substrate assembly with a discharge gas.

3. The method of manufacturing a display device as claimed in claim 2, wherein the display device includes a plasma display panel formed from the substrate assembly.

4. The method of manufacturing a display device as claimed in claim 1, wherein the composition includes:

about 50 to about 95 wt % of the conductive material;

about 1 to about 20 wt % of the organic binder; and about 1 to about 20 wt % of the glass frit.

5. The method of manufacturing a display device as claimed in claim 1, wherein the organic binder includes a compound including repeating units represented by Formula 1:

(1)

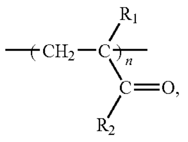

wherein, in Formula 1, n is an integer greater than or equal to 1, $R_1$ is H or $CH_3$, and $R_2$ is a linear or branched $C_1$-$C_{12}$ alkyl, a substituted or unsubstituted allyl, a substituted or unsubstituted aryl, a linear or branched $C_1$-$C_{12}$ alkoxy, a substituted or unsubstituted allyloxy, or a substituted or unsubstituted aryloxy.

6. The method of manufacturing a display device as claimed in claim 5, wherein the organic binder has a weight average molecular weight of about 1,000 to about 200,000, and an acid value of about 20 to about 250 mgKOH/g.

7. The method of manufacturing a display device as claimed in claim 1, wherein the solvent includes at least one first solvent having a boiling point of about 100° C. to about 150° C. and at least one second solvent having a boiling point of about 200° C. to about 300° C.

8. The method of manufacturing a display device as claimed in claim 7, wherein the first solvent and the second solvent are included in a first solvent:second solvent weight ratio of about 1:9 to about 9:1.

9. The method of manufacturing a display device as claimed in claim 1, wherein the glass frit has a softening point of about 300° C. to about 600° C. and a glass transition temperature of about 200° C. to about 500° C.

10. The method of manufacturing a display device as claimed in claim 1, wherein the organic binder includes a copolymer of an ethylenically unsaturated monomer and a different ethylenically unsaturated monomer.

11. The method of manufacturing a display device as claimed in claim 10, wherein the different ethylenically unsaturated monomer includes at least one of an acrylic resin, an aqueous cellulose resin, a polyvinyl alcohol resin, an epoxy resin, a melamine resin, and a polyvinyl butyral resin.

12. A method of preparing an electrode, comprising:

preparing a composition including a conductive material, an organic binder; a glass frit, and a solvent, wherein the organic binder has a glass transition temperature of about −50° C. to about −5° C.;

loading the composition into grooves of a gravure roll;

transferring the composition from the grooves of the gravure roll onto a silicone rubber blanket roll;

transferring the composition from the blanket roll onto a glass substrate; and drying and firing the composition transferred on the glass substrate.

13. An electrode composition, comprising:

a conductive material;

an organic binder;

a glass frit; and a solvent, wherein the organic binder has a glass transition temperature of about −50° C. to about −5° C.

14. The electrode composition as claimed in claim 13, wherein the composition includes:

about 50 to about 95 wt % of the conductive material;

about 1 to about 20 wt % of the organic binder; and
about 1 to about 20 wt % of the glass frit.

15. The electrode composition as claimed in claim 13, wherein the organic binder includes a compound including repeating units represented by Formula 1:

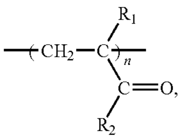

(1)

wherein, in Formula 1, n is an integer greater than or equal to 1, $R_1$ is H or $CH_3$, and $R_2$ is a linear or branched $C_1$-$C_{12}$ alkyl, a substituted or unsubstituted allyl, a substituted or unsubstituted aryl, a linear or branched $C_1$-$C_{12}$ alkoxy, a substituted or unsubstituted allyloxy, or a substituted or unsubstituted aryloxy.

16. The electrode composition as claimed in claim 15, wherein the organic binder has a weight average molecular weight of about 1,000 to about 200,000, and an acid value of about 20 to about 250 mgKOH/g.

17. The electrode composition as claimed in claim 13, wherein the solvent includes at least one first solvent having a boiling point of about 100° C. to about 150° C. and at least one second solvent having a boiling point of about 200° C. to about 300° C.

18. The electrode composition as claimed in claim 17, wherein the first solvent and the second solvent are included in a first solvent:second solvent weight ratio of about 1:9 to about 9:1.

19. The electrode composition as claimed in claim 13, wherein the glass frit has a softening point of about 300° C. to about 600° C. and a glass transition temperature of about 200° C. to about 500° C.

20. The electrode composition as claimed in claim 13, wherein the organic binder includes a copolymer of an ethylenically unsaturated monomer and a different ethylenically unsaturated monomer.

21. The electrode composition as claimed in claim 20, wherein the different ethylenically unsaturated monomer includes at least one of an acrylic resin, an aqueous cellulose resin, a polyvinyl alcohol resin, an epoxy resin, a melamine resin, and a polyvinyl butyral resin.

* * * * *